(No Model.) 2 Sheets—Sheet 1.

W. R. RONEY.
MULTITUBULAR WATER HEATER.

No. 565,394. Patented Aug. 4, 1896.

Witnesses:
John W. Adams
Louis M. F. Holstead

Inventor:
William R. Roney
by Dayton, Park & Brown his Attorneys (No Model.) 2 Sheets—Sheet 2.
W. R. RONEY.
MULTITUBULAR WATER HEATER.
No. 565,394. Patented Aug. 4, 1896.
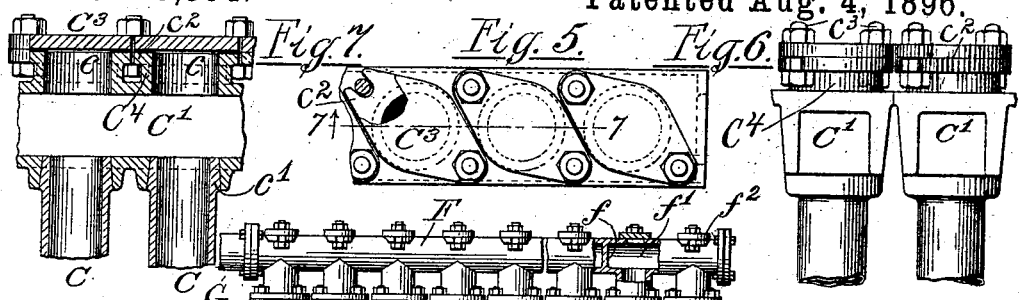
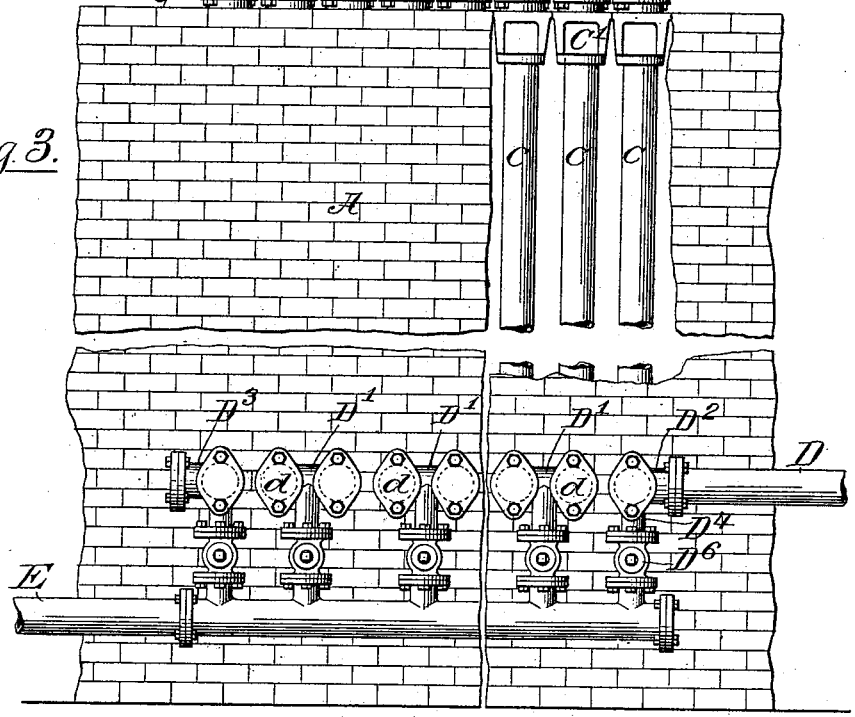
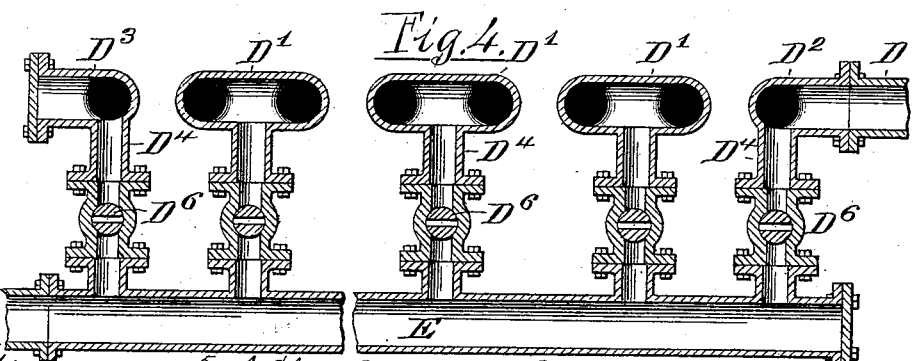
Witnesses
John W. Adams
Louis M. F. Whitehead
Inventor
William R. Roney
by Dayton, Poole & Brown
his Attorneys

UNITED STATES PATENT OFFICE.

WILLIAM R. RONEY, OF BOSTON, MASSACHUSETTS.

MULTITUBULAR WATER-HEATER.

SPECIFICATION forming part of Letters Patent No. 565,394, dated August 4, 1896.

Application filed September 8, 1893. Serial No. 485,110. (No model.)

*To all whom it may concern:*

Be it known that I, WILLIAM R. RONEY, of Boston, in the county of Suffolk and State of Massachusetts, have invented certain new and useful Improvements in Economizers; and I do hereby declare that the following is a full, clear, and exact description thereof, reference being had to the accompanying drawings, and to the letters of reference marked thereon, which form a part of this specification.

This invention relates to multitubular water-heaters or "economizers" arranged in a passage-way or flue for the products of combustion leading from boiler and other furnaces to a chimney.

It has for its objects, first, to provide a uniform water circulation throughout the whole or any used portion of the apparatus, whereby greater efficiency is obtained; second, to secure more convenient access to all parts of the interior for the removal of sedimentary matter; third, to facilitate the effective "blowing out" of the pipes or sections of the apparatus when required, and, fourth, to enable any part within the inclosing walls to be removed without disturbing said walls, and generally to facilitate repairs.

Figure 1:
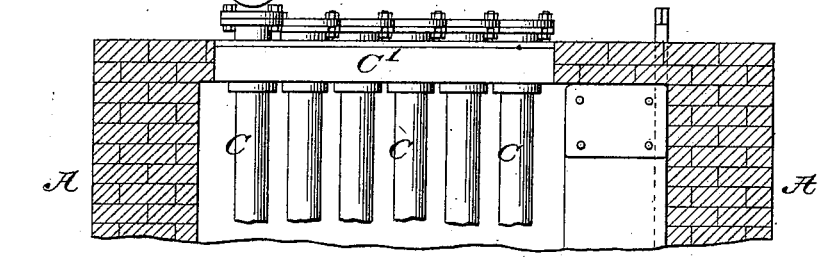
Figure 2:
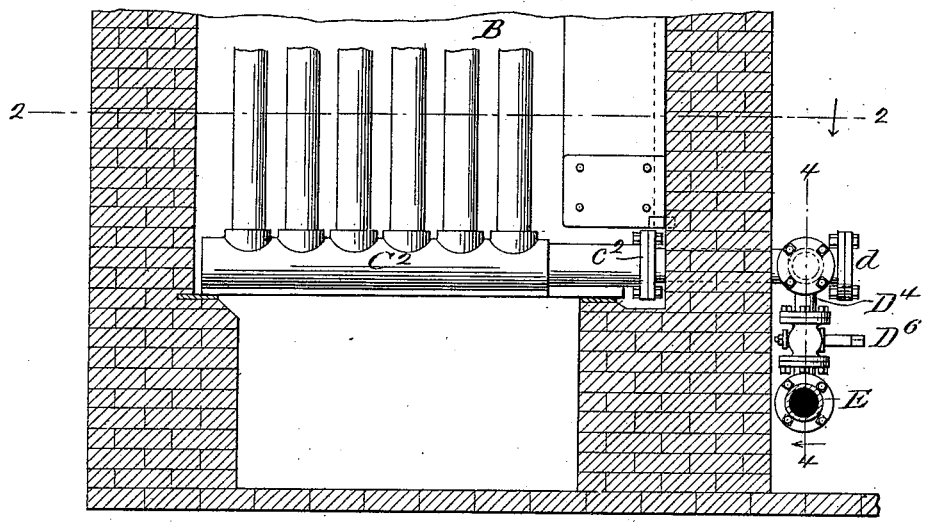
Figure 2:
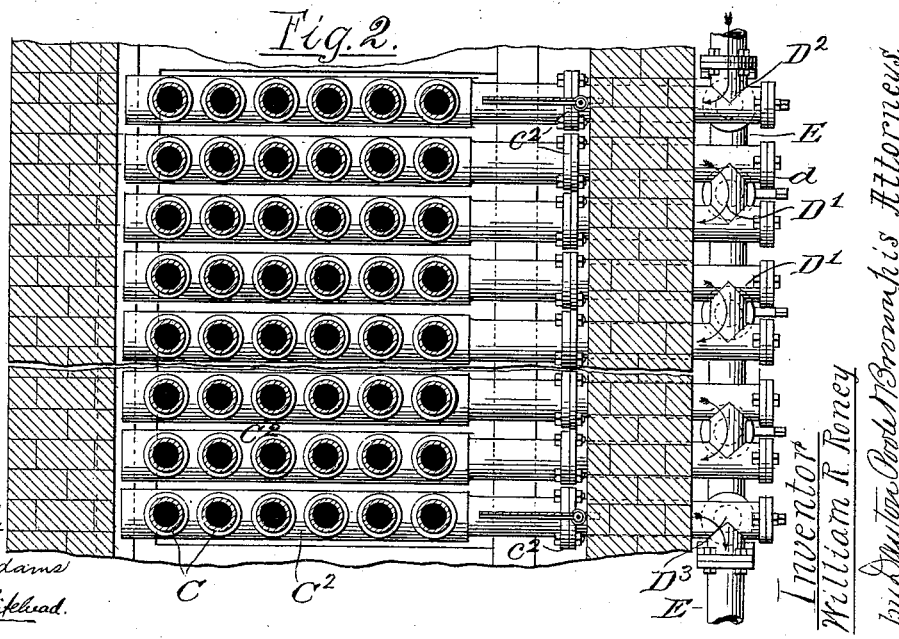

In the accompanying drawings, which illustrate my improvements, Figure 1 is an end elevation of an economizer and a vertical section of the flue-walls inclosing it. Fig. 2 is a horizontal section, looking downward, in the line 2 2 of Fig. 1. Fig. 3 is a side elevation, a portion of the inclosing flue-wall and a part of the top header-pipe being broken out. Fig. 4 is a vertical section in the plane of line 4 4 of Fig. 1. Fig. 5 is a plan of a portion of the top header-pipe enlarged. Fig. 6 is an enlarged side elevation of the upper ends of two sections of the vertical tubes and end view of two of the top boxes. Fig. 7 is a vertical section of a top box and adjacent parts in the line 7 7 of Fig. 5. Fig. 8 is a plan of a portion of one of the top boxes, showing a modified construction of the caps and securing devices.

A A represent the side walls of the chamber B, in which the economizer is set, said chamber being inclosed by the walls A A and forming part of the passage leading from the boiler or other furnaces to a suitable chimney.

C C are the vertical pipes of the economizer arranged in transverse series, forming sections, the pipes of each section being connected at their tops by one of the top boxes C' and at their lower ends by one of the bottom boxes $C^2$. There may be any desired number of these sections or cross-series of pipes C, though, in the use of the improvements herein set forth, the number of such sections in apparatus adapted for a given amount of water heating and purifying work is much less than in constructions heretofore necessarily employed.

D is the inlet-pipe.

E is the blow-off pipe.

F is the top header, and G the outlet pipe, which forms in effect an extension of the top header and leads to the boiler or other place where the heated water is to be used.

For the attainment of the primary object of my invention, to wit, the production of better circulation and consequent improved efficiency and reduction in size and cost of the structure, I replace a part or all of the continuous feed-pipe, which heretofore usually extended the entire length of the economizer and was provided with branches leading into the several bottom boxes $C^2$ with a series of connecting pipes or fittings D', which are coupled severally to pairs of the bottom boxes and have no direct communication with each other. I also replace the continuous top header-pipe, heretofore used with a pipe F, which has a number of transverse partitions *f*, adapted to connect only adjacent top boxes or cross-series of the pipe C.

The partitions *f* in the top header-pipe F alternate with the connecting pipes or fittings D', so that the interior of one of the cross-sections of pipes C (connected by the top and bottom boxes) communicates with an adjacent section of pipes through a compartment *f'* of the top header, said adjacent section with the next through a fitting D' at the bottom, and so on. That is to say, the water to be heated and purified enters from the supply-pipe D to the bottom box of the first series of vertical tubes C through a bent pipe or fitting $D^2$ and, rising through said first series of vertical pipes, enters the top box C' of that section of pipes and thence passes into the superjacent compartment *f'* of the top header F, whence it passes down only into the next section of vertical pipes, proceeding thence through the bottom box of that section into the first fitting D' and into the bottom box of the next section, thence upward and downward through alternate sections of pipes, and finally into the terminal bent pipe or fitting $D^3$. Each of said connecting-pipes and fittings D', $D^2$, and $D^3$ has a depending branch $D^4$ connecting with a horizontal blow-off pipe E, and each of said branches $D^4$ is provided with a valve $D^6$. Each of the said connecting pipes or fittings D' is shown as made of H form and as provided at the outer ends of its parallel parts or branches with caps $d$ $d$, one of which is opposite each of the bottom boxes $C^2$, so as to give direct access to each of said boxes. The fittings $D^2$ are similarly made of T shape and are provided with similar caps $d$. Similarly the top header F is provided with caps $f^2$ directly over the extreme pipes of the several cross-series of pipes C.

The top boxes C' are provided with openings $c$ $c$ in their top walls in alinement with the several pipes C C, and said openings are covered by caps $C^3$ $C^3$, which are made removable to afford access to the pipes for cleaning the same and also for the removal of the pipes. As an improved construction in means for securing said caps $C^3$ to the said boxes the parts are constructed as follows: On the upper wall of each top box C' are cast a plurality of tubular extensions $C^4$, which surround or form the walls of the openings $c$ $c$, and which are provided at their upper margins with outwardly-extending flanges $c^2$, with which are engaged bolts $c^3$ $c^3$, by which the caps $C^3$ are secured to the boxes. By reason of the closeness together of the pipes C C and the small space afforded for the caps $C^3$, the flanges $c^2$ are shown as not extending entirely around the tubular extensions $C^4$, but as extending obliquely from opposite sides thereof, while the caps $C^3$ are made of elongated form and arranged obliquely, the caps being each secured by two bolts only and overlapped, as shown in Fig. 5, so that the bolts $c^3$ $c^3$ in each instance are located in the triangular spaces between the pipes and the side margins of the box.

The advantages of the construction described will be rendered obvious from the facts that the top openings $c$ are relatively large, being made of sufficient size to permit the passage through them of the pipes C; the top boxes are made only slightly wider than the pipes and are placed side by side in contact with each other, and that the pipes secured to each box are arranged with but a small space between them. These features in the construction and arrangement of the top boxes and pipes renders it impossible to close the openings $c$ $c$ by plates bolted directly to the top walls of the boxes in the usual way, and it has therefore been common heretofore to secure the caps to the said openings by means of a central bolt engaging a cross-bar or yoke, which rests at its ends against the inner surface of the top wall at either side of the opening. In such prior construction not only is it necessary to employ an opening through the cap, which requires careful packing to prevent leakage, but the heavy cross-bars or yokes being located within the box largely restrict the flow of water therethrough. Furthermore, such bolts and yokes have been found to become quickly oxidized when used in tepid water at temperatures common in economizers, it being an admitted fact that iron parts corrode more rapidly in tepid water than in cold or very hot water. By the employment of the tubular projections or necks $C^4$, cast on the upper walls of the top boxes and provided with flanges, as described, I am enabled to secure the caps by external bolts engaging the marginal parts of the caps and the said flanges without exceeding the space made available for securing the bolts by reason of the relatively large diameter of the openings $c$ and the small spaces between them, and of the fact that the boxes are placed in contact with each other. The special arrangement of the said flanges $c^2$ and bolts herein shown and described, by which the said flanges are arranged in an oblique line at opposite sides of the openings and the bolts are arranged in pairs in the triangular spaces between the holes and the sides of the box, in itself constitutes a valuable part of my invention and is herein claimed as such.

As shown in the drawings, the upper ends of the pipes C C are secured in the lower wall of the top box by enlarged conical ends $c'$, Fig. 7, in accordance with a well-known method of construction. When the pipes are thus secured to the box, in case one of the said pipes should become broken, its upper enlarged end $c'$ may be broken and the tube lifted vertically through the top box and the superjacent opening $c$, the lower end of the tube being destitute of an enlargement $c'$. After the defective tube has been thus withdrawn a perfect one, destitute also of the upper enlargement $c'$, is let down into place through the opening $c$ and forced to a proper seat at its lower end and the joint at its upper end is made tight by packing. In this manner, and by means of the openings $c$ in the upper wall of the top boxes, any single tube C of the apparatus may be replaced without disturbing the masonry or other parts.

The flanges $c^2$ are shown as provided with open slots instead of holes to receive the bolts $c^3$. Such slots are used to facilitate the attachment and removal of the caps, the heads of the bolts in the attachment of the caps being slipped beneath the flange and the bolt then tightened by the nuts, which are applied to the upper ends thereof for convenience of access. The use of said slots is important, because the insertion of the bolts through the flanges from beneath would be impossible in the construction shown, while the application of the nuts to the lower ends of the bolts beneath the flanges would not be practicable owing to the closeness together of the edges of the flanges when the boxes are placed together. The employment of the slots, therefore, enables the bolts to be quickly applied or removed without trouble or inconvenience.

I have shown in Fig. 8 another construction in means for securing the caps $C^3$ to the box, which embodies the main features of construction hereinbefore referred to. In this case the tubular extensions $C^4$ are provided with flanges $c^4$, which extend continuously from one extension to the other, and which are provided with open slots to receive bolts $c^5$. In this instance the caps $C^3$ are each adapted to engage four bolts, the side portions of alternate caps being overlapped, so that both adjacent caps engage each pair of bolts in the manner illustrated in the drawings. In this construction the overlapping parts of the caps may be recessed to allow the caps to rest in the same plane, or the caps may be made of uniform thickness at their margins and the overlying caps may rest upon the underlying ones, in which case the former will be provided with central thickened parts or with annular flanges on their lower surfaces reaching to and making contact with the flanges on the box. In a construction of the kind last referred to the flanges $c^4$ will be so shaped at their side margins that space will be afforded for the insertion of the bolt-heads between the flanges of adjacent boxes, so that the bolts may be engaged with the slots of the flanges in the manner hereinbefore described.

The bottom boxes $C^2$ are detachably connected with the connecting-pipes $D'$ $D'$ and bends $D^2$ and $D^3$ by means of flange-joints at $c^2$ within the walls A, so that in case it is necessary to take out an entire section this may be done without disturbing the walls A A.

The valves $D^6$ enable the operator to remove the mud or sediment which may accumulate in the bottom boxes $C^2$, it being obvious that by opening either of the valves the two adjacent boxes with which the cross-pipe $D'$ is connected will be brought into communication with the blow-off pipe E, and the entire economizer being under boiler pressure, water will rush downwardly through the pipes connected with those boxes and through the boxes themselves, carrying with it the mud and sediment, which will escape through the blow-off pipe E. In case of the end sections of the economizer the opening of the valve $D^6$ will serve to clean out the single lower box only with which that valve is connected. All or a part of the valves $D^6$ may be opened at one time for discharging the sediment from the lower boxes, it being obvious that when one valve only is opened the full force of the boiler-pressure is concentrated on the section or sections with which such valve is connected.

In the construction described all parts of the interior of the apparatus are directly accessible from the exterior of the chamber B, so that the scraping out and cleansing of the entire apparatus may be accomplished without the removal of main parts thereof and without disturbing or tearing down the walls of the chamber and with little delay or inconvenience.

As a consequence of the use of transverse partitions in the top header-pipe, it is obvious that all of the water forced into the economizer must pass through every section on its way to the boiler. Superior economy and an increased heating effect are secured by this construction, because all of the water must necessarily pass through all parts of the apparatus instead of being allowed to take the shortest or easiest path through the pipes, as is liable to occur in constructions where a continuous feed-pipe extending the entire length of the economizer is used or where all the sections are in direct communication with each other.

I claim as my invention—

1. In an economizer, the combination with the transversely-arranged sections of tubes or pipes severally having a plurality of tubes and top and bottom boxes or headers with which said tubes are connected and into which they open at both ends, of connections giving communication between the said boxes or headers alternately at the top and bottom of the sections, substantially as and for the purpose set forth.

2. In combination with the sections of pipes inclosed in the chamber-walls and severally connected by top and bottom boxes, the longitudinal top header-pipe having separated compartments which communicate with the top boxes in pairs and connecting-pipes joining the bottom boxes of said tubes in alternating pairs, substantially as described and for the purpose set forth.

3. The combination with transversely-arranged sections of tubes or pipes severally having a plurality of tubes and top and bottom boxes or headers with which said tubes are connected and into which they open at both ends, of connecting-pipes giving communication between the said boxes or headers alternately at the top and bottom sections, the connecting-pipes between the bottom boxes being provided with valved blow-off passages, substantially as described.

4. The combination with transversely-arranged sections of tubes or pipes severally having a plurality of tubes and top and bottom boxes or headers with which said tubes are connected and into which they open at both ends, of connecting-pipes giving communication between the said boxes or headers alternately at the top and bottom of the sections, a common blow-off pipe and a valved passage leading from each of said connecting-pipes at the bottom of the sections to the said blow-off pipe, substantially as described.

5. In combination with the sections of connected pipes, each consisting of a plurality of pipes and a bottom box with which said pipes are connected, of connecting-pipes joining the bottom boxes of said sections in pairs and provided with branches leading to a common blow-off pipe, each provided with a valve, substantially as described.

6. The combination with transversely-arranged sections of tubes or pipes severally having a plurality of tubes and top and bottom boxes or headers with which said tubes are connected and into which they open at both ends, of connecting-pipes giving communication between the said boxes or headers alternately at the top and bottom of the sections, said pipes which join the lower boxes being each provided with two caps, one opposite each of the boxes to which the ends of the pipes are secured, substantially as described.

7. In combination with sections of pipes, each consisting of a plurality of pipes and a bottom box connected with the pipes, of connecting-pipes and bends severally provided with caps in line with the boxes and with valved branches, and a blow-off pipe into which said several valved branches lead, substantially as described.

8. The combination with walls inclosing a chamber or passage, of an apparatus within the chamber consisting of transversely-arranged sections of tubes or pipes, top and bottom boxes forming each a common connection for the pipes of each section, said top boxes being provided with openings in alinement with the pipes, and with a plurality of integral tubular extensions projecting from the upper walls of said top boxes around said openings, and having outwardly-extending flanges at their upper edges, and detachable caps secured to said extensions by means of holding devices engaging said flanges, substantially as described.

9. The combination with walls inclosing a chamber or passage, of an apparatus within the chamber consisting of transversely-arranged sections of tubes or pipes, and top and bottom boxes forming each a common connection for one of the sections, said top boxes being provided with openings in vertical alinement with the pipes, and with a plurality of integral tubular extensions projecting from the upper walls of the boxes around said openings, and provided with outwardly-extending flanges at their upper edges, said flanges projecting obliquely at opposite sides of the extensions, caps covering the ends of the tubular extensions, and two bolts for each cap located in the triangular spaces between adjacent extensions and the sides of the boxes, said bolts being engaged with the flanges and with the caps for securing the latter in place, substantially as described.

10. The combination with walls inclosing a chamber or passage, of an apparatus within the chamber consisting of transversely-arranged sections of tubes or pipes, and top and bottom boxes forming each a common connection for each section of pipes, said top boxes being provided with openings in vertical alinement with the pipes, and with a plurality of integral tubular extensions projecting from the upper walls of the boxes around said openings, and having outwardly-extending flanges at their upper edges extending obliquely therefrom, detachable caps secured to the outer ends of said tubular extensions, and bolts for securing the caps to the flanges on said tubular extensions, located in the triangular spaces between the extensions and the sides of the boxes, said flanges being provided with open slots for engagement with the bolts, substantially as described.

11. The combination with walls inclosing a chamber or passage, of an apparatus within the chamber consisting of transversely-arranged sections of tubes or pipes, severally having a plurality of upright tubes, and horizontally-arranged top and bottom boxes or headers with which said tubes have connections and into which they open at both ends, connecting-pipes giving communication between said boxes or headers alternately at top and bottom of the sections, said pipes which unite the lower boxes being permanently secured in the wall and connected with the boxes by detachable joints within the chamber, substantially as described.

12. The combination with walls inclosing a chamber or passage, of an apparatus within the chamber consisting of transversely-arranged sections of tubes or pipes severally having a plurality of tubes and top and bottom boxes or headers with which said tubes are connected and into which they open at both ends, of connecting-pipes giving communication between the said boxes or headers alternately at the top and bottom of the sections, said pipes which unite the lower boxes being permanently secured in the wall and connected with the boxes by detachable joints within the chamber, said pipes being provided each with two caps located severally in alinement with the boxes with which the ends of the pipe are connected, substantially as described.

13. The combination with walls inclosing a chamber or passage, of an apparatus within the chamber consisting of transversely-arranged sections of tubes or pipes severally having a plurality of tubes and top and bottom boxes or headers with which said tubes are connected and into which they open at both ends, and connecting-pipes giving communication between the said boxes or headers alternately at the top and bottom of the sections, the connecting-pipes joining the bottom boxes being of H form and being permanently secured in the wall and connected with the bottom boxes by flanged joints situated within the passage, the parallel parts of the pipes being located in alinement with the boxes to which they are attached and having removable caps on their outer ends, substantially as described.

14. The combination with walls inclosing a chamber or passage, of an apparatus within the chamber consisting of transversely-arranged sections of tubes or pipes severally having a plurality of tubes and top and bottom boxes or headers with which said tubes are connected and into which they open at both ends, connecting-pipes giving communication between the said boxes or headers alternately at the top and bottom of the sections, the intermediate connecting-pipes at the bottom of the sections being made of H form and having their parallel sides arranged in alinement with the boxes to which they are attached and having removable caps on their outer ends, and the end pipes being of T form and having their main parts in alinement with the boxes to which they are attached and also provided with caps on their outer ends, substantially as described.

In testimony that I claim the foregoing as my invention I affix my signature in presence of two witnesses.

WILLIAM R. RONEY.

Witnesses:
C. CLARENCE POOLE,
TAYLOR E. BROWN.